United States Patent [19]

Matsushita

[11] Patent Number: 4,507,028
[45] Date of Patent: Mar. 26, 1985

[54] COMBINED DRILL AND REAMER

[75] Inventor: Masahiro Matsushita, Daito, Japan

[73] Assignee: Densaburo Sakai, Osaka, Japan

[21] Appl. No.: 422,439

[22] Filed: Sep. 23, 1982

[30] Foreign Application Priority Data

Sep. 26, 1981 [JP] Japan ................................. 56-152422

[51] Int. Cl.³ ............................................. B23B 51/08
[52] U.S. Cl. .................................. 408/230; 408/227; 408/229
[58] Field of Search ............... 408/222, 226, 230, 223, 408/224, 227, 229; 407/53–60; 144/219, 221, 240; 145/130; 76/101 A

[56] References Cited

U.S. PATENT DOCUMENTS

| | | | |
|---|---|---|---|
| 2,918,955 | 12/1959 | Simas | 408/230 X |
| 3,147,646 | 9/1964 | Rawcliffe, Jr. | 408/230 |
| 3,575,520 | 4/1971 | Halpern | 408/225 X |
| 3,667,857 | 6/1972 | Shaner et al. | 408/230 |
| 3,824,027 | 7/1974 | Janci | 408/225 |
| 3,838,937 | 10/1974 | Haulex | 408/226 X |
| 3,863,316 | 2/1975 | Yeo | 408/230 X |
| 3,913,196 | 10/1975 | Maday | 408/230 X |
| 4,078,458 | 3/1978 | Berendzen | 408/230 X |
| 4,231,693 | 11/1980 | Kameraad | 408/230 |

FOREIGN PATENT DOCUMENTS

| | | | |
|---|---|---|---|
| 42780 | 3/1980 | Japan | 408/230 |
| 2067440 | 7/1981 | United Kingdom | 408/222 |

*Primary Examiner*—William R. Briggs
*Assistant Examiner*—Glenn L. Webb
*Attorney, Agent, or Firm*—Wenderoth, Lind & Ponack

[57] ABSTRACT

A cutting tool combining a front drill part and a rear reamer part along one axial line, having twist drill flutes through both parts and reamer cutting edges spiraling in the opposite direction to that of the drill cutting edges, whereby the tool can provide a through hole in a workpiece having a smooth surface with one forward rotating operation.

8 Claims, 12 Drawing Figures

4,507,028

COMBINED DRILL AND REAMER

BACKGROUND OF THE INVENTION

The present invention relates to a combined drill and reamer and, more particularly, to a combination tool having in one line a twist drill part and a spiral reamer part.

Referring to FIGS. 1 and 2, conventionally, a drill of rod type C to be adapted for drilling and finishing a hole in a workpiece has hitherto been constructed as a combination of a drill part A at the front portion and a reamer part B at the rear portion, both disposed in a single line as one unit. In the known construction, the drill portion A includes a chisel edge 2 with a drill point 1 and a pair of relieved taps 4 and chip grooves 6 with tap margins 5 therebetween, both of which are formed of spirals in one direction around the axial line of the drill. Also, the reamer portion B includes a pair of reamer cutters 7 and chip flutes 9 with cutter margins 8 therebetween, both of which are formed of spirals in the other direction, opposite to that of the drill portion, with a slanting angle of 4° to 10° with respect to the axial line X of the drill. Therefore, the chip grooves 6 and chip flutes 9 to cross each other, so that the chip pieces of the workpiece cut off by the relieved taps 4 and reamer cutters 7 are sometimes made to block the way for the removal of such chips through the chip grooves 6 and chip flutes 9. In addition thereto, the slanting angle of the reamer cutters 7 is not large enough to produce a cutting force for obtaining a fine finished surface of the hole drilled in the workpiece. Accordingly, on the application of the drill to a workpiece such as 60 mm thick steel plate, the drilled surface of the hole is always provided with a hard roughness, as shown in FIG. 3, resulting in the need for further treatment to finish the surface of hole by the employment of a broach-reamer.

SUMMARY OF THE INVENTION

Accordingly, an essential object of the present invention is to provide an improved combined drill and reamer of the type referred to above which can eliminate the above disadvantages inherent in the conventional drill.

Another object of the present invention is to provide a combined drill and reamer which by itself drill in a workpiece a hole having a fine finished surface, especially, on the application of the reamer part of the drill, without removing the chip pieces of the workpiece from the acting field of drilling and reaming.

A further object of the present invention is to provide a long lived combined drill and reamer which is simple in construction and arcuate in operation, and can be manufactured in any size at low cost.

In order to accomplish these and other objects of, according to the present invention, there is provided a combined drill and reamer which comprises as one unit in its axial line a twist drill part for drilling, a spiral reamer part for correction finishing and a shank part for the chucks of a drill. Twist drill part includes a straight chisel edge provided at its tip end so as to cross the axial line, a pair of radial drill cutting edges each extending radially from a respective one of the ends of the chisel edge to its periphery in a given inclination having a point angle to its axial line and a chisel edge angle to the chisel edge and, a pair of twist drill flutes each extended twistingly with a given helix angle along the axial line through said twist drill part and spiral reamer part in succession. Each flute has a given flute length from the corresponding radial drill cutting edges to the end of said spiral reamer part, is provided with an open recess of a sufficient given flute width for removing many chip pieces as they are cut away from a workpiece drilled by means of cutting means of said twist drill part, and is spiral reamer part and symmetrical to the other flute. Between the flutes the web has a thickness which gradually increases toward the end of said spiral reamer part along the axial line for keeping enough strength to be prevented from bending along the axial line. The twist drill part also has a pair of twist drill cutting edges, each having at a given length and extending along the forward side of the respective drill flutes in association with a land. The spiral reamer part is provided with a starting taper for biting into the edge of the workpiece to cut and a back taper for cutting the workpiece finished along the axial line on its periphery, and includes several reamer flutes on the land portion between the pair of twist drill flutes bridging said drill flutes at a given pitch to each other and spiraling along the axial line in the direction opposite to the twisting direction of the twist drill flutes with a certain helix angle within a range of 40° to 65° with respect to the axial line. A reamer cutting edge is provided along the forward side of each reamer flute in association with a land which includes a margin.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
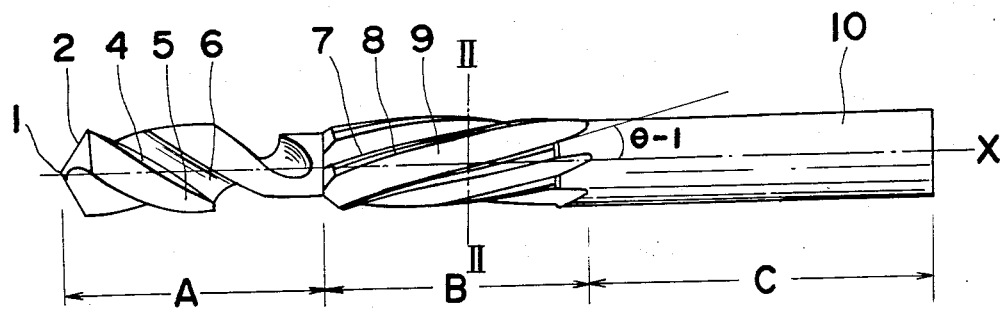
FIG. 1 is a side elevational view showing a conventional combination drill as already described above.
Figure 2:
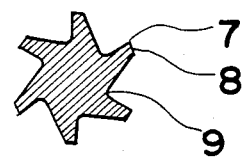
FIG. 2 is a cross-sectional view taken along a line II—II of FIG. 1.

Before the description of the present invention proceeds, it is to be noted that like parts are designated by like reference numerals throughout the accompanying drawings.

Referring now to FIGS. 4 to 10, there is shown a combined drill and reamer 11, according to one preferred embodiment of the present invention, composed as one solid unit of a shank part S, a spiral reamer part T and a twist drill part R, all of which are arranged in order along its axial line X so as to define the given overall length of the combined drill and reamer.

The shank part S is formed of a bar which can be of several types such as cylindrical, tapered, or threaded, hand, or adapted to be inserted in a socket the like, with a given diameter and length for providing a portion adapted to be inserted in the chuck of a driving means, such as a shaft or motor, for the rotation of the combined drill and reamer. The shank part S is disposed at one end of the combined drill and reamer in coincidence of its central axial line with the axial line X of the combined drill and reamer in association with the spiral reamer part T.

The twist drill part r is formed of a kind of twist drill including a straight chisel edge 12, a pair of radial drill cutting edges 13, a pair of twist drill flutes 14 and a pair of twist drill cutting edges 15 in association with lands 16 all disposed within a given drill length, which is length greater than the thickness of workpiece to be drilled the drill bit part R being adapted for drilling a hole in the workpiece. The twist drill part R is disposed at the other end of the combined drill and reamer with its central axial line in coincidence with the axial line X of the combined drill and reamer in association with the spiral reamer part T which is disposed between the shank part S and twist drill part R.

The straight chisel edge 12 is disposed at the extreme tip end of the combined drill and reamer and crosses axial line X so as to define a center of twist drill part R with respect to the workpiece hole in the work to be drilled, at a first stage of drilling. The two radial drill cutting edges 13 extend symmetrically to each other about the axial line X, extending radially from both ends of the chisel edge to its periphery with a given inclination with respect to axial line Y having a point angle against its axial line X and extending at a chisel edge angle with respect to the chisel edge so as to be adapted to drill a hole on the workpiece by the rotation of the twist drill part R at a second stage of drilling.

Figure 10:
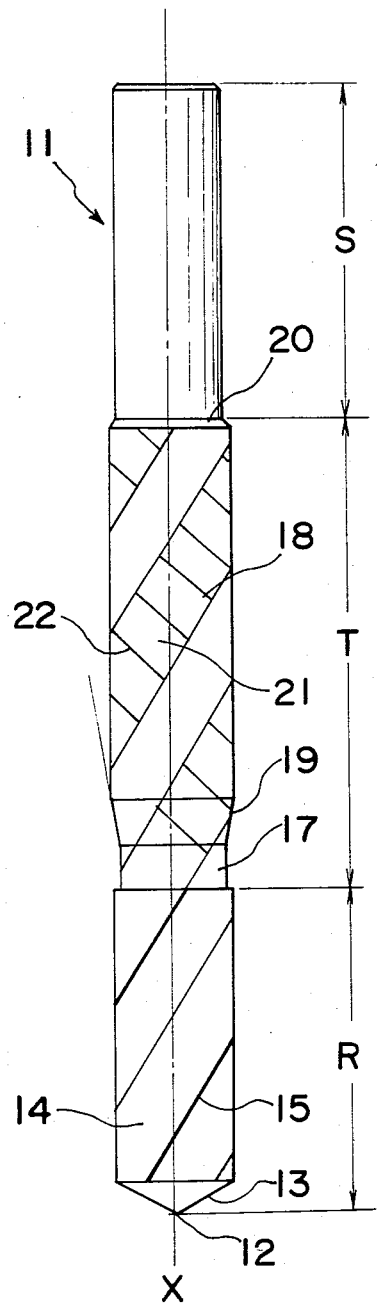
FIG. 10 is a schematic side elevational view of FIG. 4.

Also, the two twist drill flutes 14 are disposed symmetrical to each other about the axial line X extending twistingly at a given helix angle $\theta 1$ along the axial line X from all along the extent of the radial drill cutting edges 13 to the end of the spiral reamer part T as shown in FIG. 10. It is to be noted that the twist drill flutes 14 each extend through the twist drill part R and spiral reamer part T in succession and provides an open recess with a sufficient given flute width to permit the removal of many workpiece chips which have been cut away from the workpiece during the drilling by means of cutting edges of the twist drill part R and spiral reamer part T. Retaining lands 16 are provided between flutes and constitute tapered webs each having a web thickness which gradually increases toward the end of said spiral reamer part T along axial line X for keeping its strength sufficient to prevent bending along axial line X in the overall length of the combined drill and reamer.

The pair of twist drill cutting edges 15 are provided on the forward sides of the twist drill flutes 14 in a given edge length twisting with the same helix angle $\theta 1$ to that of the twist drill flutes 14, so as to be adapted to drill a hole in the workpiece of substantially predetermined dimensions with allowance for finishing during a third stage of drilling. The twist drill cutting edges 15 are associated with the lands 16 in which margins are not provided. As is usual, the configurations of twist drill cutting edges 15 are such as to spiral around axial line X in one direction while extending rearwardly along axial line X, so that twist drill cutting edges 15 have small negative helix angles $\theta 1$ such as $-35°$ with respect to the axial line X in association with the twist drill flutes 14.

The spiral reamer part T is formed of a kind of spiral reamer including a front neck 17, a cutting portion including a chamfer 19 and a spiral reamer 18, and a rear neck 20, all disposed in order along axial line X of the combined drill and reamer coincident with the central axial line of spiral reamer part T. As described above, the twist drill flutes 14 are formed through the spiral reamer part T following the twist drill part R to provide a passage for removing many chips from the workpiece. Lands are left between the twist drill flutes 14, on which are provided a set of spiral reamer flutes 21 and a set of spiral reamer cutting edges 22 in association with reamer lands 23 incluidng margins 24 all disposed in the cutting portion T of a given reamer length.

The front and rear necks 17 and 20 are provided with small diameters along short lengths to bridge the twist drill part R and spiral reamer part T, and spiral reamer part T and shank part S, respectively.

The cutting portion includes the chamfer 19 disposed next to the front neck 17, with a starting taper of chamfer angle $\theta 3$, for instance 5°, and the spiral reamer 18 disposed between the chamfer 19 and rear neck 20 with a back taper of small angle along axial line X of the combined drill and reamer. The chamfer 19 is adapted to bite and ream within the finishing allowance left in the hole in the workpiece drilled by the twist drill part R, during a fourth space of reaming, and the spiral reamer 18 is adapted to provide finishing of the hole in the workpiece during a final stage of reaming.

Also, the cutting portion includes the set of spiral reamer flutes 21 and the corresponding reamer cutting edges 22 with reamer lands 23 all disposed on the lands 16 between twist drill flutes 14. The set of spiral reamer flutes 22 is disposed on the lands 16 symmetrically to each other around axial line X and extending spiralingly at a given helix angle $\theta 2$ with respect to axial line X through the cutting portion. Each of the reamer flutes 21 defines an open recess with a sufficient given flute width for removing many chips from the workpiece as they are cut away from the workpiece reamed by means of the cutting edges 22 of spiral reamer part T and directing such chips into the twist drill flutes 14. Retaining reamer lands 23 are constituted with a web taper producing a web thickness which gradually increases toward the end of said spiral reamer part T along axial line X for keeping the reamer part T strong enough to prevent it from bending along axial line X. It is to be noted that the spiral reamer flutes 21 bridge the two twist drill flutes 14 at a given pitch to each other, while spiraling along axial line X in the direction opposite to the twisting direction of the twist drill flutes 14 at a certain helix angle $\theta 2$ within a range $+40°$ to $+65°$ with respect to the axial line. Also, the number of spiral reamer flutes 21 is in this embodiment, for instance, set at six, all disposed within a circle around axial line X at symmterical positions so as to be spaced with an even angle of 30° to the others.

The set of reamer cutting edges 22 is provided on the forward sides of the spiral reamer flutes 21 in a given edge length, twisting with the same helix angle $\theta2$ as that of the spiral reamer flutes 21, so as to be adapted to ream the hole in the workpiece into the finished dimensions during the final stage of reaming. The reamer cutting edges 22 are associated with lands 23 in which margins 24 are provided to back up the corresponding reamer cutting edges 22 in parallel relationship thereto. Accordingly, as do the spiral reamer flutes 21, the reamer cutting edges 22 are formed to spiral circularly around axial line X in one direction while extending rearwardly along axial line X, so that the inclination of the reamer cutting edges 22 is set in a positive direction $\theta2$ opposite to the negative direction $\theta1$ of the twist drill cutting edges 15 so as to obtained a kind of biting effect for cutting the workpiece which is similar to that providing by the radial drill cutting edges 13 having a positive direction for cutting upon the rotation of combined drill and reamer. It is to be noted that the helix angle $\theta2$ of inclination of the reamer cutting edges 22 resides within a range of $+40°$ to $+65°$, preferably $+45°$ to $+50°$, with respect to its axial line to obtain a good cutting effect, and, if the helix angle $\theta2$ is set under $40°$, the efficiency for cutting of the reamer cutting edges is lower than that of a conventional tool, while, if the helix angle $\theta2$ is set over $65°$, the quality of finishing obtained is worse than expected in practical use.

Figure 11:
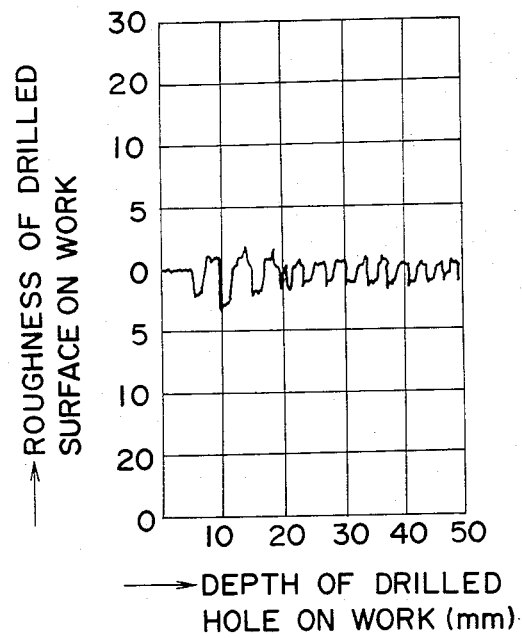
FIG. 11 is a graph similar to FIG. 3, for a hole in a workpiece drilled by the drill of FIG. 4.

Also, the number of the reamer cutting edges 22 is set at less than four in a cross section of the spiral reamer part T perpendicular to its axial line X, when the diameter of spiral reamer part T is smaller than 10 millimeters, at four to six, when the diameter is within a range of 10 to 20 millimeters, or at more than six, when the diameter is larger than 20 millimeters, whereby the rotation of reamer cutting edges 22 can provide a hole in the workpiece with a drilled surface having a five micron roughness regardless of the depth of the drilled hole, as shown in FIG. 11.

With the above construction, the combined drill and reamer is driven by a driving means coupled with the shank part S to rotate in one direction about its axial line X and pressed forwardly against a workpiece to drill a hole cutting oil being supplied around the neck 20 disposed between the shank part S and spiral reamer 18 into the pair of twist drill flutes 14 connected with spiral reamer flutes 21 for preventing the occurrence of a seizure between the workpiece and the combined drill and reamer in a known manner. The twist drill part R is adapted to first drill a through hole in the workpiece, and then the spiral reamer part T is adapted to then ream the inner surface of hole in finishing, while the resulting chips from the workpiece cut off from the workpiece by the cutting means of the twist drill part R are removed the through the twist drill flutes 14 to the outside, and the chips from the workpiece by the cut off from the workpiece cutting means of the spiral reamer part T are removed through the spiral reamer flutes 21 connected with the twist drill flutes 14.

Figure 3:
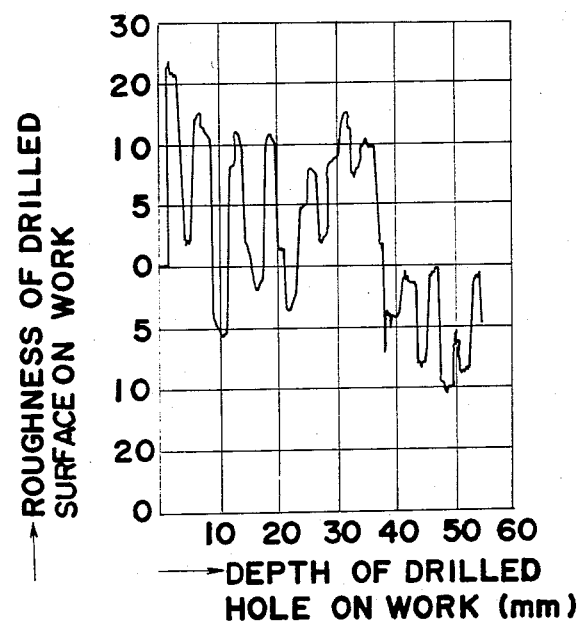
FIG. 3 is a graph showing the result of a finish-turn inspection for a hole in a workpiece drilled by the drill of FIG. 1 indicating as a function of the depth of the drilled hole as the roughness of the surface of the hole.
Figure 4:
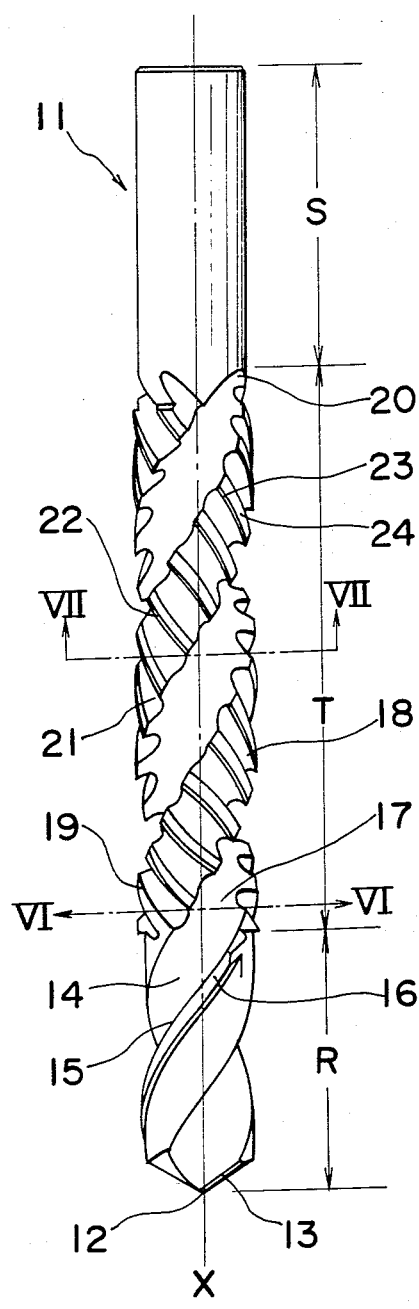
FIG. 4 is a side elevational view of a combined drill and reamer in accordance with one preferred embodiment of the present invention.
Figure 5:
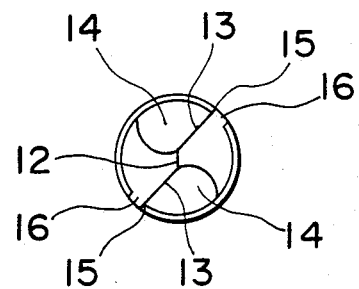
FIG. 5 is a front view of the drill of FIG. 4.
Figure 6:
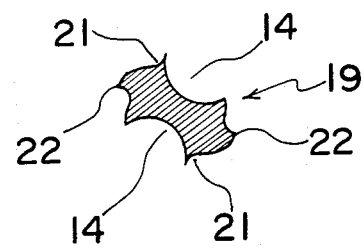
FIG. 6 is a cross-sectional view taken along a line VI—VI of FIG. 4.
Figure 7:
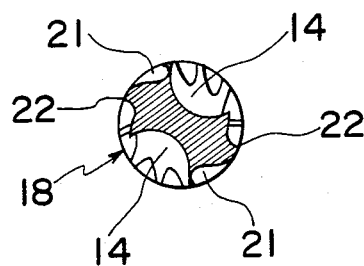
FIG. 7 is a cross-sectional view taken along a line VII—VII of FIG. 4.
Figure 8:
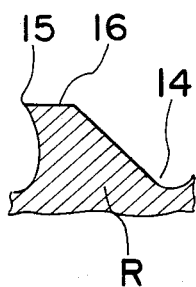
FIG. 8 is a cross-sectional view, on an enlarged scale, showing a drill cutting edge of FIG. 6.
Figure 9:
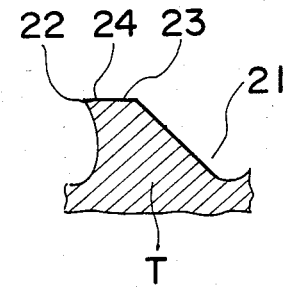
FIG. 9 is a cross-sectional view, on an enlarged scale, showing a reamer cutting edge of FIG. 7.

When, for instance, a steel plate having a thickness of 60 millimeters like the one utilized to provide the test results illustrated in FIG. 3 is employed as a workpiece, and the combined drill and reamer of the above embodiment is applied to drill a like through hole in the plate a through hole is provided in the workpiece, which has a fine surface of finished roughness having an accuracy of finishing within a range of 2 to 4 microns upon the measurement of a finish-turn inspection of the resultant, hole as shown in the graph of FIG. 11 showing roughness as a function of depth within the hole as waves of small amplitude. The through hole is obtained in a workpiece a short time of about twenty minutes by one forward drilling operation of the combined drill and reamer without providing a prepared hole beforehand. In addition, the roughness of the drilled surface of the through hole of the workpiece is smoothed with fine precision, by the provision of reamer cutting edges having a positive helix angle $\theta2$ larger than that of the conventional reamer in order to make the finish of the hole effective, and larger than that of the spiral reamer flutes 21 connected with the twist drill flutes 14 in order to remove the chips of the workpiece cut from the working field of hole without any problems such as seizure, vibration or the like. Accordingly, by the employment of the combined drill and reamer of the present invention it is not necessary to use a conventional broach-reamer any more so as to perform a further stage of finishing the drilled surface of hole after the hole is provided in workpiece by a drill.

Figure 12:
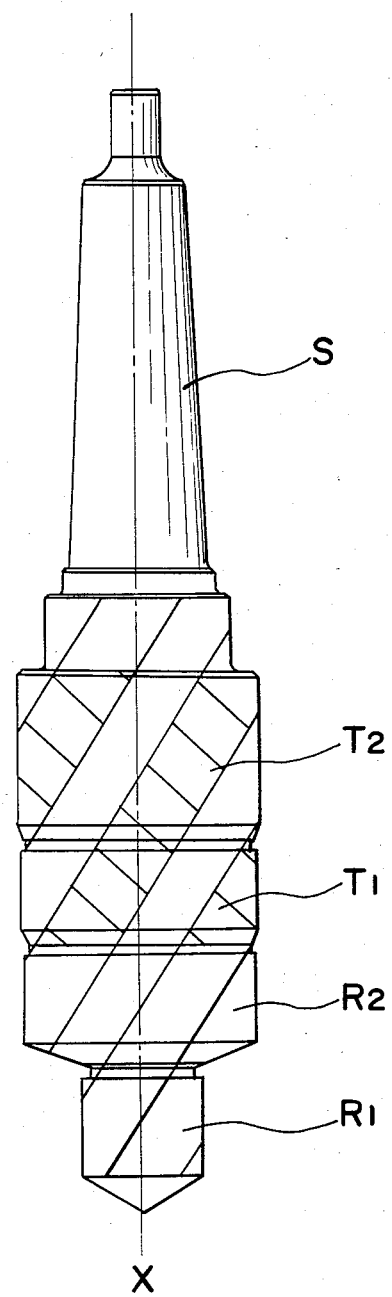
FIG. 12 is a schematic side elevational view of a combined drill and reamer in accordance with another preferred embodiment of the present invention.

Although the present invention has been fully described with reference to a preferred embodiment, many modifications and variations thereof will now be apparent to those skilled in the art. For example, the twist drill part R may be construed as a step drill providing a plurality of adjacent drill parts for example two drill parts R1 and R2, each having the same construction but different diameters from the others, and, also, the spiral reamer part T may be construed as a line reamer providing a plurality of adjacent reamer parts, for example two reamer parts T1 and T2, each having the same construction but different diameters from the others, as shown in FIG. 12. Also, a recessing edge may be provided on the radial drill cutting edge for facilitating of the biting of the drill into the workpiece so as to produce only small chips of the workpiece, during drilling. In any case, the scope of the present invention is therefore to be limited not by the details of the preferred embodiments described above, but only by the terms of the appended claims.

What is claimed is:

1. A combined drill and reamer tool, comprising:
    a cylindrical body having a longitudinally extending axis of rotation, said body including a twist drill part for drilling, and a spiral reamer part for finishing, a hole in a workpiece having a thickness less than the respective longitudinal lengths of said twist drill part and said spiral reamer part, and a shank part for being held by the chuck of a rotary drill, said twist drill part being formed at one longitudinal end of said body, said shank part being formed at the other longitudinal end of said body, and said spiral reamer part being formed between said shank part and said twist drill part;
    said twist drill part having;
        a free tip end having a straight chisel edge and first and second radial drill cutting edges extending generally radially from opposite ends of said chisel edge to the radial periphery of said free tip end,
        an other end of said twist drill part, opposite said free tip end, and
        first and second twist drill cutting edges, respectively extending helically in a first circumferential direction at a same first helix angle with respect to said axis, from said first and second drill cutting edges at the radial periphery of said free tip end to said other end of said twist drill part;

said twist drill part and said spiral reamer part having first and second twist drill flutes for passing therethrough chips of a workpiece cut away by said combined drill and reamer tool upon rotative application of said tool by the drill to the workpiece, respectively extending spaced from, parallel to and along the full extent of said first and second twist drill cutting edges, and a first drill twist land between said first twist drill cutting edge and said first twist drill flute and a second twist drill land between said second twist drill cutting edge and said second twist drill flute, said first twist drill flute and said first land, and said second twist drill flute and said second land, respectively continuing longitudinally beyond said first and second twist drill cutting edges at said first helix angle through said spiral reamer part;

said spiral reamer part having;
- a front neck of short longitudinal length adjacent said other end of said twist drill part,
- a plurality of spiral reamer cutting edges, each spiraling on and extending completely across said first and second drill twist lands from said front neck to said shaft part around said axis in a circumferential direction opposite said first circumferential direction at a second helix angle with respect to said axis in the range 40° to 65°,
- a chamfer of short longitudinal length adjacent said front neck, for facilitating said plurality of spiral reamer cutting edges biting into the workpiece,
- a plurality of spiral reamer flutes formed in said first and second drill twist lands spaced from and extending parallel to respective ones of said plurality of spiral reamer cutting edges so as to spiral about said axis at said second helix angle for providing passages opening into said first and second twist drill flutes for passing therethrough into said first and second twist drill flutes chips of the workpiece cut away by said plurality of spiral reamer
- a plurality of spiral reamer lands bridging the respective spaces between each of said plurality of spiral reamer cutting edges and said respective ones of said plurality of spiral reamer flutes, on each of said first and second twist drill lands, and
- a rear neck of short longitudinal length adjacent said shank part.

2. A combined drill and reamer tool as defined in claim 1, wherein said second helix angle of each of said plurality of reamer flutes is in the range 45° to 50° with respect to said axis.

3. A combined drill and reamer tool as defined in claim 1, wherein said twist drill part is formed as a step drill.

4. A combined drill and reamer tool as defined in claim 1, wherein said spiral reamer part is formed as a line reamer.

5. A combined drill and reamer tool as defined in claim 1, wherein said land of said twist drill part excludes a margin.

6. A combined drill and reamer tool as defined in claim 1, wherein the diameter of said spiral reamer part is smaller than 10 millimeters, said plurality of spiral reamer flutes including less than four spiral reamer flutes in a cross section of said spiral reamer part perpendicular to said axis.

7. A combined drill and reamer tool as defined in claim 1, wherein the diameter of said spiral reamer part is within a range 10 to 20 millimeters, said reamer flutes including between four and six spiral reamer flutes in a cross section of said spiral reamer part perpendicular to said axis.

8. A combined drill and reamer tool as defined in claim 1, wherein the diameter of said spiral reamer part is larger than as 20 millimeters, said plurality of spiral reamer flutes including more than six spiral reamer flutes in a cross section of said spiral reamer part perpendicular to said axis.

* * * * *